(12) United States Patent
Newberg et al.

(10) Patent No.: US 9,332,573 B2
(45) Date of Patent: May 3, 2016

(54) METHOD AND APPARATUS FOR BEARER CONTROL IN A GROUP CALL

(71) Applicant: MOTOROLA SOLUTIONS, INC, Schaumburg, IL (US)

(72) Inventors: Donald G Newberg, Hoffman Estat, IL (US); Peter M Drozt, Prairie Grove, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 159 days.

(21) Appl. No.: 14/132,472

(22) Filed: Dec. 18, 2013

(65) Prior Publication Data

US 2015/0173107 A1    Jun. 18, 2015

(51) Int. Cl.
| | |
|---|---|
| H04M 3/42 | (2006.01) |
| H04W 72/00 | (2009.01) |
| H04W 76/00 | (2009.01) |
| H04W 76/06 | (2009.01) |
| H04W 4/22 | (2009.01) |
| H04W 28/24 | (2009.01) |
| H04W 4/10 | (2009.01) |

(52) U.S. Cl.
CPC .......... *H04W 76/005* (2013.01); *H04W 76/002* (2013.01); *H04W 76/068* (2013.01); *H04W 4/10* (2013.01); *H04W 4/22* (2013.01); *H04W 28/24* (2013.01); *H04W 76/007* (2013.01)

(58) Field of Classification Search
CPC ....... H04M 3/56; H04W 72/04; H04W 24/00; H04W 28/08
USPC ................ 455/416, 450, 452.1–452.2, 453
See application file for complete search history.

(56) References Cited

U.S. PATENT DOCUMENTS

| | | |
|---|---|---|
| 8,355,413 B2 | 1/2013 | Vasamsetti et al. |
| 8,422,448 B2 | 4/2013 | Chu et al. |
| 2012/0026880 A1 | 2/2012 | Miller et al. |
| 2012/0250509 A1* | 10/2012 | Leung .................. H04W 76/04 370/235 |
| 2013/0136036 A1 | 5/2013 | Chen et al. |
| 2013/0159521 A1 | 6/2013 | Marocchi et al. |

(Continued)

FOREIGN PATENT DOCUMENTS

| | | |
|---|---|---|
| WO | 2009109803 A1 | 11/2009 |
| WO | 2014036339 A2 | 3/2014 |

OTHER PUBLICATIONS

Doumi T et al.: "LTE for public safety networks", IEEE Communications Magazine, IEEE Service Center, Piscataway, US, vol. 51, No. 2, Feb. 2013, pp. 106-112.

(Continued)

*Primary Examiner* — Christopher M Brandt
*Assistant Examiner* — Matthew Genack (57) ABSTRACT

A method and service network element are provided that provide for bearer control in a group call. The method and service network element receive a trigger to adjust a quality of service (QoS) level of an uplink bearer established for a group call, identify, based on a profile associated with each user device of multiple user devices participating in the group call, one or more user devices of the multiple participating user devices as candidates for a quality of service (QoS) adjustment of an uplink bearer, and adjust a QoS level of an uplink bearer, of the multiple uplink bearers, of a participating user device of the multiple participating user devices identified as a candidate for a QoS adjustment.

26 Claims, 7 Drawing Sheets

(56) References Cited

U.S. PATENT DOCUMENTS

2014/0064210 A1* 3/2014 Anchan ................ H04W 72/08
370/329
2015/0092542 A1* 4/2015 Yang ................ H04W 28/0268
370/230

OTHER PUBLICATIONS

International Search Report and Written Opinion, PCT/US2014/07843, mailed Jun. 2, 2015.

* cited by examiner

FIG. 9C

METHOD AND APPARATUS FOR BEARER CONTROL IN A GROUP CALL

CROSS-REFERENCE TO RELATED APPLICATIONS

This application is related to U.S. patent application Ser. No. 14/132,416, filed on the same date as this application, which application is assigned to Motorola Solutions, Inc., and which application is hereby incorporated herein in its entirety.

FIELD OF THE INVENTION

The present invention relates generally to wireless communication systems, and, in particular, to group call bearer control in a wireless communication system.

BACKGROUND OF THE INVENTION

In order to provide mission critical Push-to-Talk (PTT) group calls in a 3GPP LTE (Third Generation Partnership Project Long Term Evolution) communication system, it is desirable that wireless resources be guaranteed so that such resources are always available when needed. However, this can be an issue when a large number of emergency responders are at a same location, for example, an incident scene, resulting in available bandwidth that is insufficient to provide all of the emergency responders with a bearer. For downlink communications, such bandwidth constraints can be resolved through the use of broadcast, for example, and LTE eMBMS (Evolved Multimedia Broadcast Multicast Service) service. However, for uplink communications, there is no way to share a single uplink bearer among the members of the group. If every user who is a group member is assigned an uplink bearer, this can block other important uplink traffic due to a lack of available resources for such other traffic, even if most of the users do not transmit.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION OF THE INVENTION

To address the need for assuring uplink bearer availability for high priority users, a method and service network element are provided that provide for bearer control in a group call. The method and service network element receive a trigger to adjust a quality of service (QoS) level of an uplink bearer established for a group call, identify, based on a profile associated with each user device of multiple user devices participating in the group call, one or more user devices of the multiple participating user devices as candidates for a quality of service (QoS) adjustment of an uplink bearer, and adjust a QoS level of an uplink bearer, of the multiple uplink bearers, of a participating user device of the multiple participating user devices identified as a candidate for a QoS adjustment.

Generally, an embodiment of the present invention encompasses a method for bearer control in a wireless communication system. The method includes receiving a trigger to adjust a quality of service (QoS) level of an uplink bearer established for a group call, identifying, based on a profile associated with each user device of a plurality of user devices participating in the group call, one or more user devices of the plurality of participating user devices as candidates for a QoS adjustment of an uplink bearer, and adjusting a QoS level of an uplink bearer, of the plurality of uplink bearers, of a participating user device of the plurality of participating user devices identified as a candidate for a QoS adjustment.

Another embodiment of the present invention encompasses a service network element capable of bearer control. The service network element includes processor that is configured to receive a trigger to adjust a QoS level of an uplink bearer established for a group call, identify, based on a profile associated with each user device of a plurality of user devices participating in the group call, one or more user devices of the plurality of participating user devices as candidates for a QoS reconfiguration of an uplink bearer, and adjust a QoS level of an uplink bearer, of the plurality of uplink bearers, of a participating user device of the plurality of participating user devices identified as a candidate for a QoS adjustment.

Figure 1:
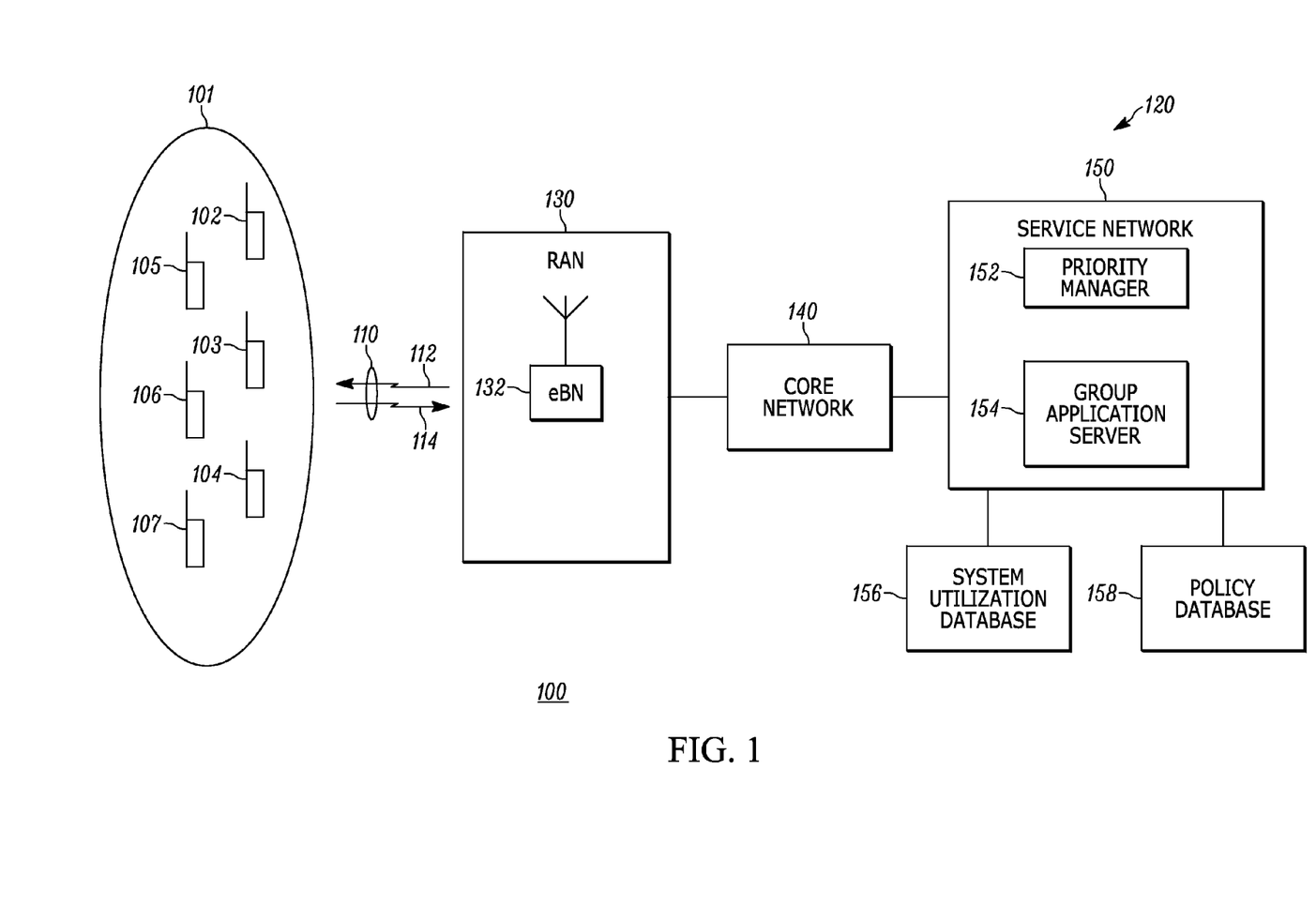
FIG. 1 is a block diagram of a wireless communication system in accordance with an embodiment of the present invention.

The present invention may be more fully described with reference to FIGS. 1-9C. FIG. 1 is a block diagram of a wireless communication system 100 in accordance with an embodiment of the present invention. Communication system 100 includes multiple user devices 102-107 (six shown), such as but not limited to a cellular telephone, a radio telephone, a personal digital assistant (PDA), laptop computer, or personal computer with radio frequency (RF) capabilities, or a wireless modem that provides RF access to digital terminal equipment (DTE) such as a laptop computer. In various technologies, user devices 102-107 may be referred to as a mobile station (MS), user terminal (UT), user equipment (UE), subscriber station (SS), subscriber unit (SU), remote unit (RU), access terminal, and so on. The users of the multiple user devices 102-107 are all members of a same talk group 101, which talk group may be pre-determined or may be dynamically determined, for example, as the users arrive at an incident scene, and correspondingly the multiple user devices 102-107 are all part of a same group call.

Communication system 100 further includes a radio access network (RAN) 130 in communication with a core network 140, such as an Evolved Packet Core (EPC) of a 3GPP LTE (Third Generation Partnership Project Long Term Evolution) communication system. Access network 130 includes one or more wireless access nodes 132 (one shown) that each provides wireless communication services to user devices residing in a coverage area of the access node via a corresponding air interface, such as user devices 102-107 and air interface 110 with respect to access node 132. Preferably, wireless access node 132 is an eNodeB; however, wireless access node 132 may be any network-based wireless access node, such as an access point (AP) or base station (BS). Access network 132 also may include one or more access network controllers (not shown), such as a Radio Network Controller (RNC) or a Base Station Controller (BSC), coupled to the one or more access nodes; however, in various embodiments of the present invention, the functionality of such an access network controller may be implemented in the access node. As is known in the art, core network 140 may include, among other core network elements, a Mobility Management Entity (MME), multiple gateways, such as a Serving Gateway and a Public Data Network Gateway (PDN GW), a Policy Control and Charging Rules Function (PCRF), and a Home Subscriber Server (HSS).

Core network 140 further is coupled to a service network 150 that is hierarchically above the core network. Service network 150 includes one or more Application Servers (ASs) or other services network elements implementing an Application Function (AF), such as a Priority Manager (PM) 152 or a Group Application Server 154, for example, a Push-to-Talk (PTT) Server. While PM 152 and Group Application Server 154 are depicted as separate service network elements, in other embodiments of the present invention PM 152 and Group Application Server 154 may be included in a same service network element. Each service network element 152, 154 has a connection with the PDN GW of the core network to convey user data and a connection with the PCRF of the core network to convey control data.

Further, each service network element 152, 154 can access each of a system utilization database 156 and a policy database 158. System utilization database 156 maintains information concerning a utilization of system resources, such as an availability of wireless resources, that is, an available channel capacity, at each access node 132 of access network 130, an availability of backhaul paths from each such access node to the service network elements 152, 154, and a length of time (consecutive and/or non-consecutive) that each user device 102-107 utilizes service network 150, for example, how much time each user device consumes transmitting, for example, audio, on an uplink bearer. For example, each access node 132 may periodically update system utilization database 156 with its channel capacity or the access node may update the system utilization database in response to a request from an element implementing the system utilization database. In various embodiments of the present invention, system utilization database 156 may be an independent network element or may reside in, or be distributed among, any of an element of access network 130, such as an eNode, an element of core network 140, such as an MME, or an element of service network 150.

Policy database 158 maintains policy rules for making policy decisions regarding active user devices, such as available services and applications and priorities associated with each such service or application or priorities of the users, such as a quality of service (QoS) level required or acceptable for a service data flow associated with such a service or application (as a higher QoS typically indicates a higher priority service or application). In various embodiments of the present invention policy database 158, too, may be an independent network element or may reside in any of an element of core network 140, such as a PCRF, or an element of service network 150, such as either of PM 152 and Group Application Server 154.

Together, each of the elements of access network 130, such as access node 132, the elements of core network 140, service network elements 152 and 154, system utilization database 156, and user policy database 158 may be referred to as an infrastructure 120 of communication system 100 and, correspondingly, each of access node 132, the elements of core network 140, service network elements 152 and 154, system utilization database 156, and policy database 158 may be referred to as an infrastructure element.

Air interface 110 comprises multiple downlink bearers 112 and multiple uplink bearers 114. The multiple uplink bearers 114 include multiple unicast uplink bearers and the multiple downlink bearers 112 includes multiple downlink unicast bearers and one or more broadcast or multicast bearers. As used herein, a 'bearer' refers to a data transmission path (that is, a 'bearer' as used herein is used to convey media) whose endpoints are an element of service network 150, such as Priority Manager 152 or Group Application Server 154, and a user device, such as user devices 102-107. Thus, a unicast uplink bearer has a wireless path, from a user device to an access node, and a network transport path, from the access node to the service network element. While different unicast uplink bearers may share a common network transport path through infrastructure 120 to an element of service network 150, they are unicast uplink bearers in the sense that they are Point-to-Point (PTP), that is, they employ a unicast channel in uplink 114 and have, as a user endpoint, a single user device. Further, the unicast uplink bearers are dedicated bearers, as they cannot be shared between user devices, and may be pre-emptable or non-pre-emptable. A non-pre-emptable bearer is a bearer that cannot be released and a pre-emptable bearer is a bearer that can be released. However, any bearer may have their QoS level adjusted during a group call.

Referring now to FIGS. 2-5, block diagrams are provided of a user device 200, such as user devices 102-107, access node 132, Priority Manager 152, and Group Application Server 154 in accordance with embodiments of the present invention. Each of user device 200, access node 132, Priority Manager 152, and Group Application Server 154 includes a respective processor 202, 302, 402, and 502, such as one or more microprocessors, microcontrollers, digital signal processors (DSPs), combinations thereof or such other devices known to those having ordinary skill in the art. The particular operations/functions of processors 202, 302, 402, and 502, and thus of user device 200, access node 132, Priority Manager 152, and Group Application Server 154, is determined by an execution of software instructions and routines that are stored in a respective at least one memory device 204, 304, 404, and 504 associated with the processor, such as random access memory (RAM), dynamic random access memory (DRAM), and/or read only memory (ROM) or equivalents thereof, that store data and programs that may be executed by the corresponding processor and that allows the user device, access node, Priority Manager, and Group Application Server to perform all functions necessary to operate in communication system 100. Each of user device 200 and access node 132 further includes a respective radio frequency (RF) transceiver 208, 306 for exchanging RF messaging between the user device and the access node over an intervening air interface.

Figure 2:
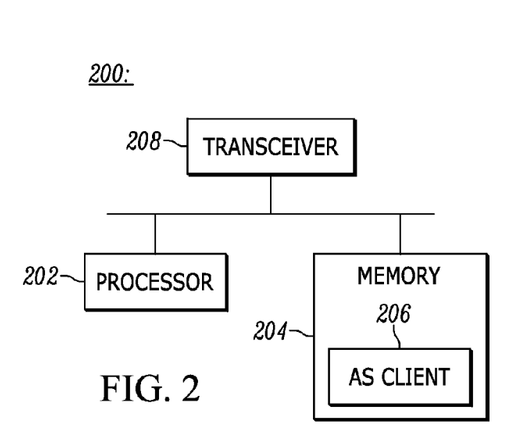
FIG. 2 is a block diagram of a user device of the communication system of FIG. 1 in accordance with an embodiment of the present invention.
Figure 3:
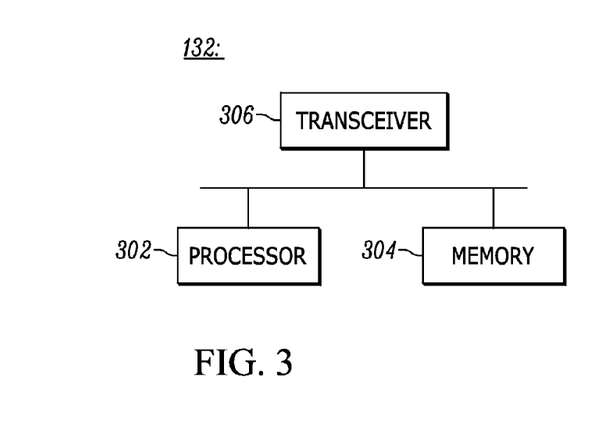
FIG. 3 is a block diagram of an access node of the communication system of FIG. 1 in accordance with an embodiment of the present invention.

The at least one memory device 204 of user device 200 further maintains one or more application layer clients 206 (one shown) that, when executed by processor 202, communicates with a corresponding application executed by an Application Function (AF), such as PM 152 or Group Application Server 154. For example, the one or more application layer clients 206 may include a PM client that would communicate with PM 152 and/or a Push-to-Talk (PTT) client that would communicate with Group Application Server 154.

Figure 4:
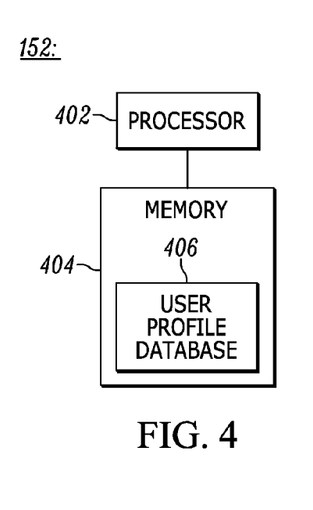
FIG. 4 is a block diagram of a Priority Manager of the communication system of FIG. 1 in accordance with an embodiment of the present invention.
Figure 5:
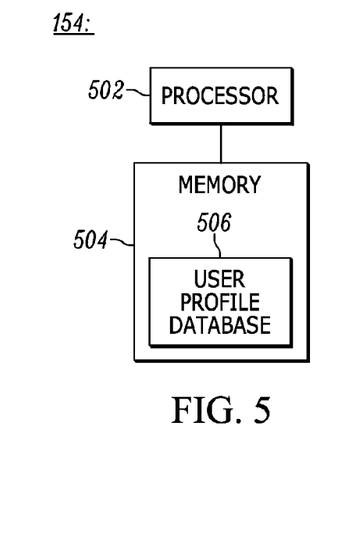
FIG. 5 is a block diagram of a Group Application Server of the communication system of FIG. 1 in accordance with an embodiment of the present invention.

In addition, one or more of the at least one memory devices 404, 504 of PM 152 and Group Application Server 154 further includes a respective user profile database 406, 506, that maintains a profile associated with a user of each user device that is a member of the communication groups served by the PM or Group Application Server, such as communication group 101 and user devices 102-107. In various embodiments of the present invention, parameters stored in a profile may be pre-provisioned in the PM or Group Application Server, may be provided to the PM or Group Application Server by a user device when the user device activates in communication system 100, and/or may be retrieved by the PM or Group Application Server from elements of infrastructure 120. In other embodiments of the present invention, the parameters stored in user profile database 406 may instead, or in addition, be stored in policy database 156.

The parameters maintained in a user's profile may include a location of the user, such as an access node or a cell serving a user device associated with the user. For example, the PM or Group Application Server may retrieve mobility information associated with a user device, such as a location of the user device, from a location and mobility database of communication system 100, such as a Home Subscriber Server (HSS), a Home location Register (HLR), a Visited Location Register (VLR)), or an application level location service. For example, the PM or Group Application Server may query a PCRF of core network 140 for the identity of an access node and cell serving a user device. In response to receiving the query, the PCRF may retrieve, from an HSS, an identifier of a cell, such as a Physical Cell Identifier (PCI), a Target Cell Identifier (TCI), and a E-UTRAN Cell Global Identifier (ECGI), which serves the user device and provides the retrieved cell identifier to the PM or Group Application Server.

The parameters maintained in a user's profile further may include a pre-emption vulnerability, wherein whether or not a user/user's bearer is pre-emptable may be indicated in the profile by a pre-emption vulnerability flag, a priority level associated with the user, an identifier of each communication group of which the user is a member, such as communication group 101 with respect to users associated with user devices 102-107, a time period that has expired since a user device associated with the user has most recently transmitted on an uplink bearer, a role of the user, such as an employment area, title, or responsibility, associated with the user device, a relationship between the user and one or more other members of a communication group that includes the user, such as communication device 101 with respect to user devices 102-107, and any other prioritization of the user and/or user's device over another user/user device.

A determination of a location, such as a cell or an access node serving the user device, may be used to determine a number of user devices that are participating in the group call and served at the same cell or access node. Further, based on the determined location, a determination may be made of an availability of radio frequency (RF) resources at that cell or access node and correspondingly a number of unicast uplink bearers that may be established for user devices participating in the group call at that cell or access node. Further, a user's profile may include a priority level range, for example, where some users may not be permitted to use a higher priority level.

A QoS level for a user's unicast uplink bearer then may be determined based on one or more of the parameters in the user's profile, such as a default pre-emption vulnerability and/or priority level, an amount of time that has expired since a user device associated with the user has most recently transmitted on an uplink bearer, the role of the user, the relationship between the user and one or more other members of a communication group that includes the user, and any other prioritization of the user and/or user's device over another user/user device. Such user profile parameters are also referred to herein as QoS attributes, as they may be used to determine a QoS level for a unicast uplink bearer established for a user. For example, in general, the lower the pre-emption vulnerability and/or the higher priority level of the user/user device, the higher the QoS level that may be applied to a unicast uplink bearer established for that user. Other parameters, such as system utilization, also may be considered in determining a unicast uplink bearer QoS level.

When a unicast uplink bearer is needed for a participant in a group call that does not currently have a unicast uplink bearer established, for example, because the user/user device is a new joiner to the call, because the user/user device did not have a unicast uplink bearer initially assigned, or because the unicast uplink bearer established for the user/user device has been released, and insufficient bandwidth is available for establishment of a unicast uplink bearer for that user/user device, unicast uplink bearers may be released from other users/user devices at the same cell/access node as the participant needing the unicast uplink bearer, based on their QoS levels, wherein bearers associated with lower QoS levels are released before bearers associated with higher QoS levels. The users/user devices whose unicast uplink bearers are released need not be participants in the group call, but rather may be any user/user device at that cell/access node.

Figure 6:
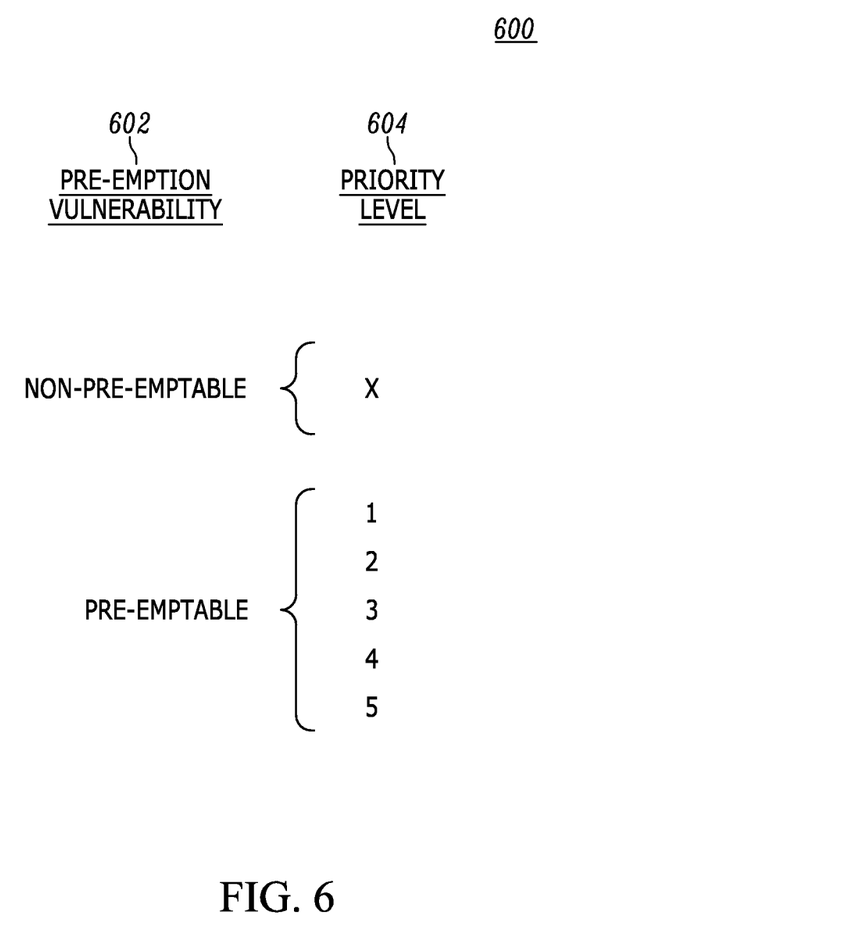
FIG. 6 is a table depicting exemplary pre-emption vulnerabilities and priority levels that may be assigned to a user in accordance with an embodiment of the present invention.

Referring now to FIG. 6, a table 600 is provided that depicts exemplary pre-emption vulnerabilities and priority levels that may be assigned to a user. A first column 602 of table 600 lists multiple pre-emption vulnerabilities that may be assigned to a user. For example and as depicted in table 600, a bearer may be pre-emptable or non-pre-emptable. When a bearer is non-pre-emptable, the bearer cannot be released. When a bearer is pre-emptable and a bearer is needed for a user that does not have a bearer currently established for the group call, the bearer can be released ('pre-empted'), thereby freeing up bandwidth for establishment of a bearer for the user that does not have a bearer currently established. However, a non-pre-emptable bearer can be reduced to being a pre-emptable bearer during a group call, and a pre-emptable bearer can be elevated to being a non-pre-emptable bearer during a group call. A second column 604 of table 600 then lists multiple priority levels that may be assigned to a user. A non-pre-emptable user has a highest priority level (indicated as 'X'). By way of another example, a highest priority level may be '0', wherein a priority level of '0' indicates that a bearer is non-pre-emptable. Pre-emptable bearers then may have one of multiple priority levels, for example, priority levels 1 through 5 wherein a priority level of 1 is a highest (pre-emptable) priority level and a priority level of 5 is a lowest (pre-emptable) priority level. When a bearer is needed for one or more users that do not have a bearer currently established for a group call, for example, because they are new joiners to the call or because they did not have a bearer assigned to them, and insufficient bandwidth is available for establishment of bearers for those users, it is preferable, though not necessary, that bearers be released based on their priority level, wherein bearers established for lower priority users (for example, a user with a priority level of 5) are released before bearers are released for higher priority users (for example, a user with a priority level of 4). Further, the bearers would be released from other users/user devices at the same cell/access node as the user needing the unicast uplink bearer; however, such other users/user devices need not be participating in the same group call as the user/user device needing a bearer. While five pre-emptable priority levels are depicted in table 600, one of ordinary skill in the art realizes that any number of priority levels may be used and the number of priority levels is up to a designer of the communication system. In various embodiments of the present invention, when a request for establishment of a unicast uplink bearer is received, the requested bearer may or may not be permitted to pre-empt already established bearers, or the requested bearer may be permitted to pre-empt bearers only up to a certain priority level.

In one exemplary illustration of an assignment of pre-emption vulnerabilities and priority levels to users, user devices associated with a user who has a more important role, with respect to an incident, may have a different pre-emption vulnerability or a higher priority level than user devices associated with users that have a less important role. For example, tactical units may be have a lower pre-emption vulnerability (that is, may be less vulnerable to pre-emption, that is, may be non-pre-emptable) or may have a higher priority level than beat police, control center responders may have a lower pre-emption vulnerability/higher priority level than a responder on the street, a specialist, such as a hazardous material responder, may have a lower pre-emption vulnerability/higher priority level than a non-specialized responder, or military personnel may have a higher pre-emption vulnerability/priority level than civilian officials (or vice versa, depending on the incident).

In another exemplary illustration of an assignment of pre-emption vulnerabilities and priority levels to users, a relationship between a user and one or more other participants in the group call may be considered in assigning a pre-emption vulnerability/priority level. That is, a user device associated with a user who has a more elevated, or important, role, such as a higher public safety position, among the responders to an incident may have a lower pre-emption vulnerability/higher priority level than user devices associated with another responder. For example, a fire/police sergeant may have a lower pre-emption vulnerability/higher priority level than a non-officer, a fire/police lieutenant may have a lower pre-emption vulnerability/higher priority level than a fire/police sergeant, a fire/police battalion commander may have a lower pre-emption vulnerability/higher priority level than a fire/police lieutenant, a high ranking city official may have a lower pre-emption vulnerability/higher priority level than a fire/police commander, and so on.

In yet another exemplary illustration of an assignment of pre-emption vulnerabilities and priority levels to users, user devices that have most recently transmitted on an uplink bearer as part of a group call involving communication group 101 may be assigned a higher priority level than user devices that have less recently transmitted on an uplink bearer as part of a group call involving the communication group.

The embodiments of the present invention preferably are implemented within user devices 102-107, access node 132, Priority Manager 152, and Group Application Server 154, and more particularly with or in software programs and instructions stored in the respective at least one memory device 204, 304, 404, and 504, and executed by respective processors 202, 302, 402, and 502, associated with the of the user device, access node, Priority Manager, and Group Application Server. However, one of ordinary skill in the art realizes that the embodiments of the present invention alternatively may be implemented in hardware, for example, integrated circuits (ICs), application specific integrated circuits (ASICs), and the like, such as ASICs implemented in one or more of user devices 102-107, access node 132, Priority Manager 152, and Group Application Server 154. Based on the present disclosure, one skilled in the art will be readily capable of producing and implementing such software and/or hardware without undo experimentation.

Communication system 100 comprises a wireless communication system that employs an evolved Multimedia Broadcast Multicast Service (eMBMS) scheme for group calls. Preferably, communication system 100 is a Third Generation Partnership Project (3GPP) Long Term Evolution (LTE) communication system. However, communication system 100 may operate in accordance with any wireless telecommunication system employing an eMBMS scheme and wherein there is limited bandwidth availability for distribution among the uplink bearers established for members of a communication group at any given time, such as communication group 101 and user devices 102-107.

In the prior art, uplink bearers may be reserved for all group members arriving at an incident scene, resulting in a potential lack of bearers for allocation to later arriving group members, or to other later arriving groups, and a rejection of bearer requests associated with the late arrivers, regardless of a priority of such requests. Or, bearers may be allocated to group members on an 'as needed,' or first come first serve, basis and when no more bearers are available for allocation, subsequent bearer requests associated with group members, or with other groups, will be rejected, again regardless of a priority of the request. One result of such a system is that if a bearer request is received for a new, higher priority user, service, or application and no more bearers are available for allocation, the bearer request will be rejected. Plus, when allocating bearers on an 'as needed' basis, valuable time is consumed in setting the bearers up. In order to better assure uplink bearer availability to a higher priority user, service, or application, and to minimize any wait time before such a user may transmit on the uplink bearer, communication system 100 provides a bearer allocation scheme that provides for a distribution of bandwidth among unicast uplink bearers established for participants in a group call, wherein a highest QoS level is provided for uplink bearers established for top priority users, or user devices. Further, the bearer allocation scheme may provide pre-emptable and non-pre-emptable bearer allocations, such that communication system 100 may preempt a pre-emptable unicast uplink bearer established for a lower priority users/user device at the same cell/access node as a group call participant needing a unicast uplink bearer. Again, it may be noted that the user/user device whose unicast uplink bearer is pre-empted need not be a participant in the same group call as the participant needing the unicast uplink bearer.

Figure 7:
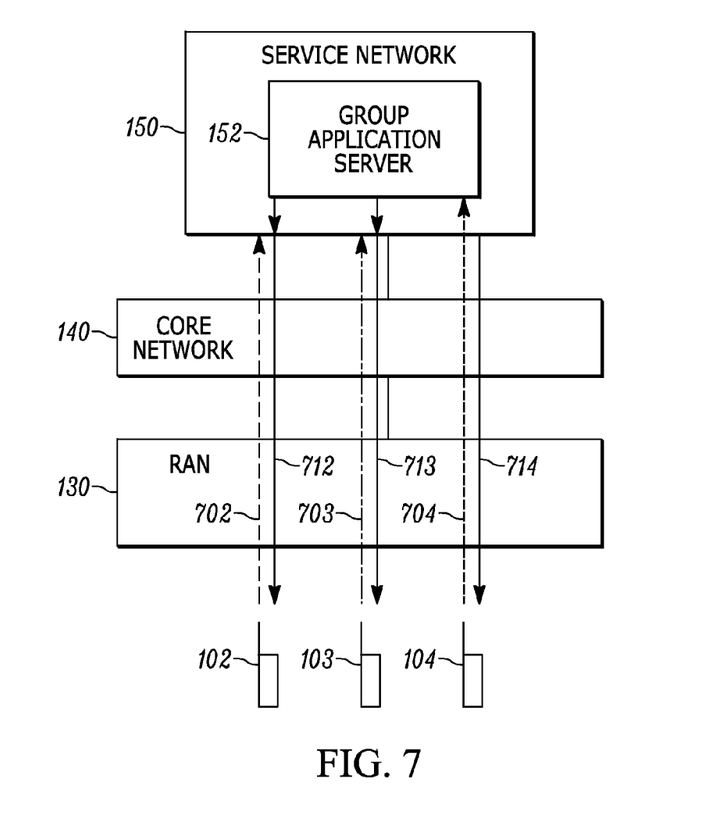
FIG. 7 is a block diagram depicting an exemplary configuration of unicast uplink bearers as part of a group call by the communication system of FIG. 1 in accordance with an embodiment of the present invention.
Figure 8:
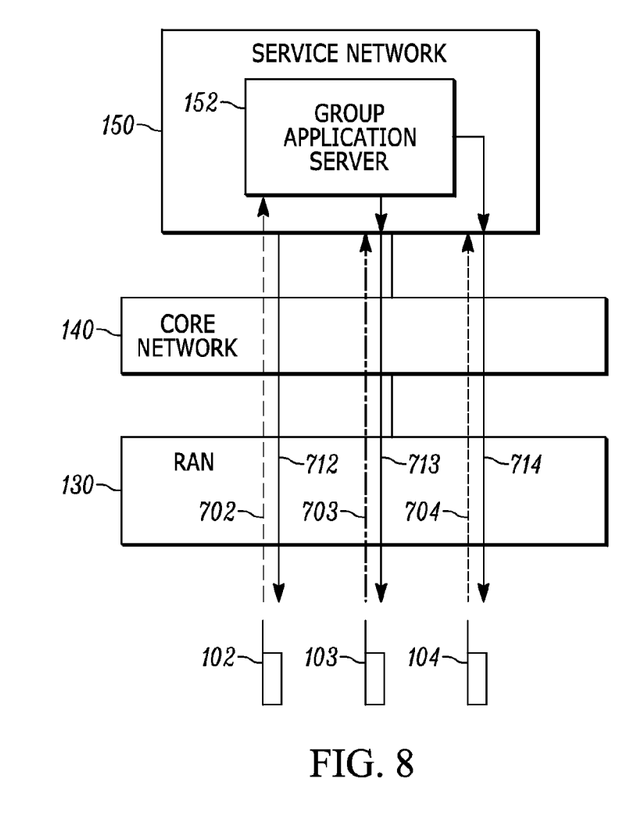
FIG. 8 is a block diagram depicting an exemplary configuration of unicast uplink bearers as part of a group call by the communication system of FIG. 1 in accordance with an embodiment of the present invention.

For example, and referring now to FIGS. 7 and 8, block diagrams are provided depicting an exemplary configuration of unicast uplink bearers as part of a group call by communication system 100 in accordance with an embodiment of the present invention, wherein QoS levels are determined based on the QoS attribute, that is, the user profile parameter, of how recently a user has transmitted on his/her uplink bearer. As depicted in FIG. 7, a respective unicast uplink bearer 702-704 and a respective unicast downlink bearer 712-714 is established for each of multiple users, that is, user devices 102-104, of communication group 101. However, in other embodiments of the present invention, broadcast bearers may be used for downlink communications. As the current talker (the holder of the floor), user device 104 has a unicast uplink bearer 704 of a highest QoS level. User device 103, as a recent talker, has a unicast uplink bearer 703 of a lower QoS level (than user device 104). And user device 102, as a least recent talker, has a unicast uplink bearer 702 of a lowest QoS level (relative to user devices 103 and 104). User devices 102 and 103 are receiving on their respective downlink bearers 712 and 713, but as user device 104 is the current talker, user device 104 is not receiving on its downlink bearer 714.

FIG. 8 then depicts an adjustment of the QoS levels of the unicast uplink bearers of the user devices of communication group 101 in response to a transfer of the floor from user device 104 to user device 102. Again, each user device 102-104 has a respective unicast uplink bearer 702-704 and a respective unicast downlink bearer 712-714. Prior to being granted the floor, uplink unicast bearer 702 of user device 102 was a lower priority (relative to the unicast uplink bearers established for user devices 103 and 104) pre-emptable bearer. Since user device 102 now is the talker, the QoS level of user device 102's uplink bearer 702 is raised such that unicast uplink bearer 702 now has the highest QoS level among unicast uplink bearers 702-704. And as user device 103 is the least recent talker between user devices 102-104, the QoS level of unicast uplink bearer 703 is decreased, such that unicast uplink bearer 703 now has the lowest QoS level among unicast uplink bearers 702-704. The priority levels associated with user devices 102 and 103 may or may not be correspondingly adjusted as well. User devices 103 and 104 are receiving on their respective downlink bearers 713 and 714, but as user device 102 is the current talker, user device 102 is not receiving on its downlink bearer 712. Further, with respect to FIGS. 7 and 8, if a unicast uplink bearer should need to be pre-empted so that a unicast uplink bearer can be established for a user/user device currently without a unicast uplink bearer, then unicast uplink bearer 712 of user device 102 would be pre-empted in FIG. 7, and unicast uplink bearer 713 of user device 103 would be pre-empted in FIG. 8.

By adjusting a QoS level of the unicast uplink bearers allocated to each of user devices 102-104, communication system 100 controls which users/user devices will be pre-empted, that is, have their unicast uplink bearers released, when the communication system runs out of bandwidth. That is, as depicted in FIGS. 7 and 8, a higher QoS level (and a corresponding higher priority level) may be accorded to current and most recent talkers and a lower QoS level (and a corresponding lower priority level) may be accorded to less recent talkers, with the result that higher QoS levels (and, although not necessarily, higher priority levels) are accorded to current and most recent talkers, who are most likely to talk again, and lower QoS levels (and, although not necessarily, lower priority levels) are accorded to users who are least recent talkers and correspondingly who are least likely to talk again. Further, the users accorded the lower QoS levels are the users most likely to have their unicast uplink bearers released when the communication system runs out of bandwidth.

Figure 9A:
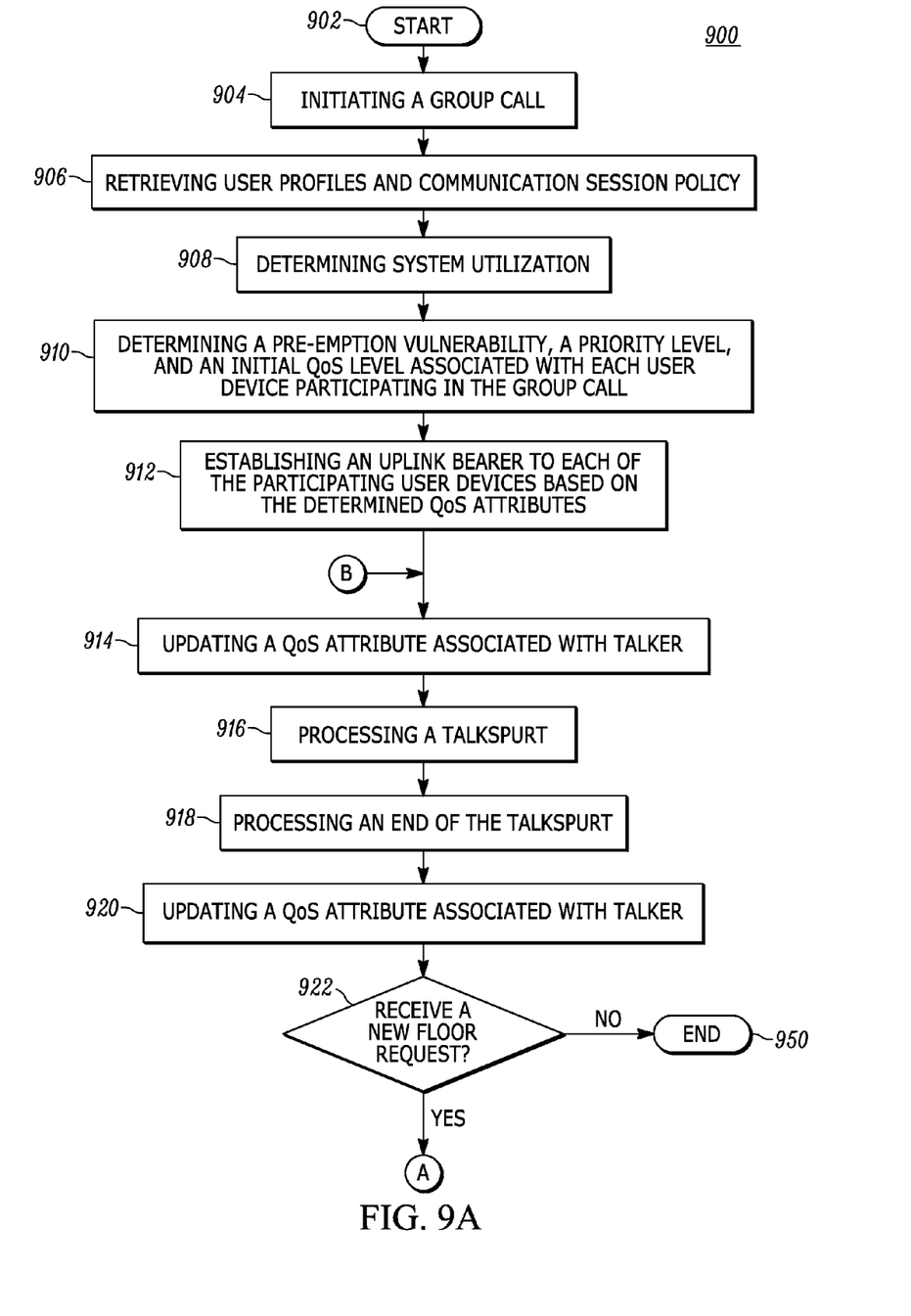
FIG. 9A is a logic flow diagram illustrating a method of bearer control performed by a service network element of the communication system of FIG. 1 in accordance with various embodiments of the present invention.
Figure 9B:
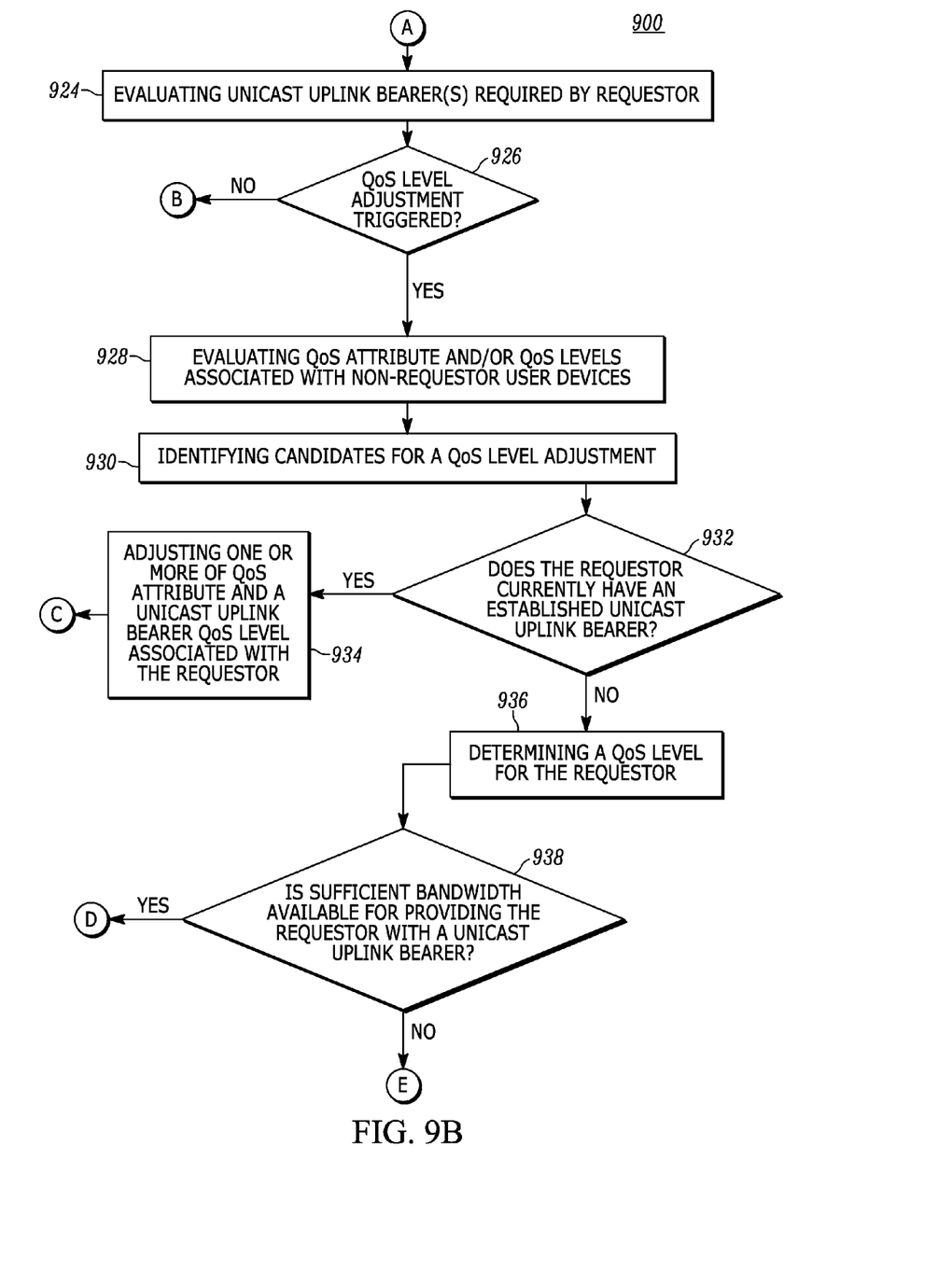
FIG. 9B is a continuation of the logic flow diagram of FIG. 9A illustrating a method of bearer control performed by a service network element of the communication system of FIG. 1 in accordance with various embodiments of the present invention.
Figure 9C:
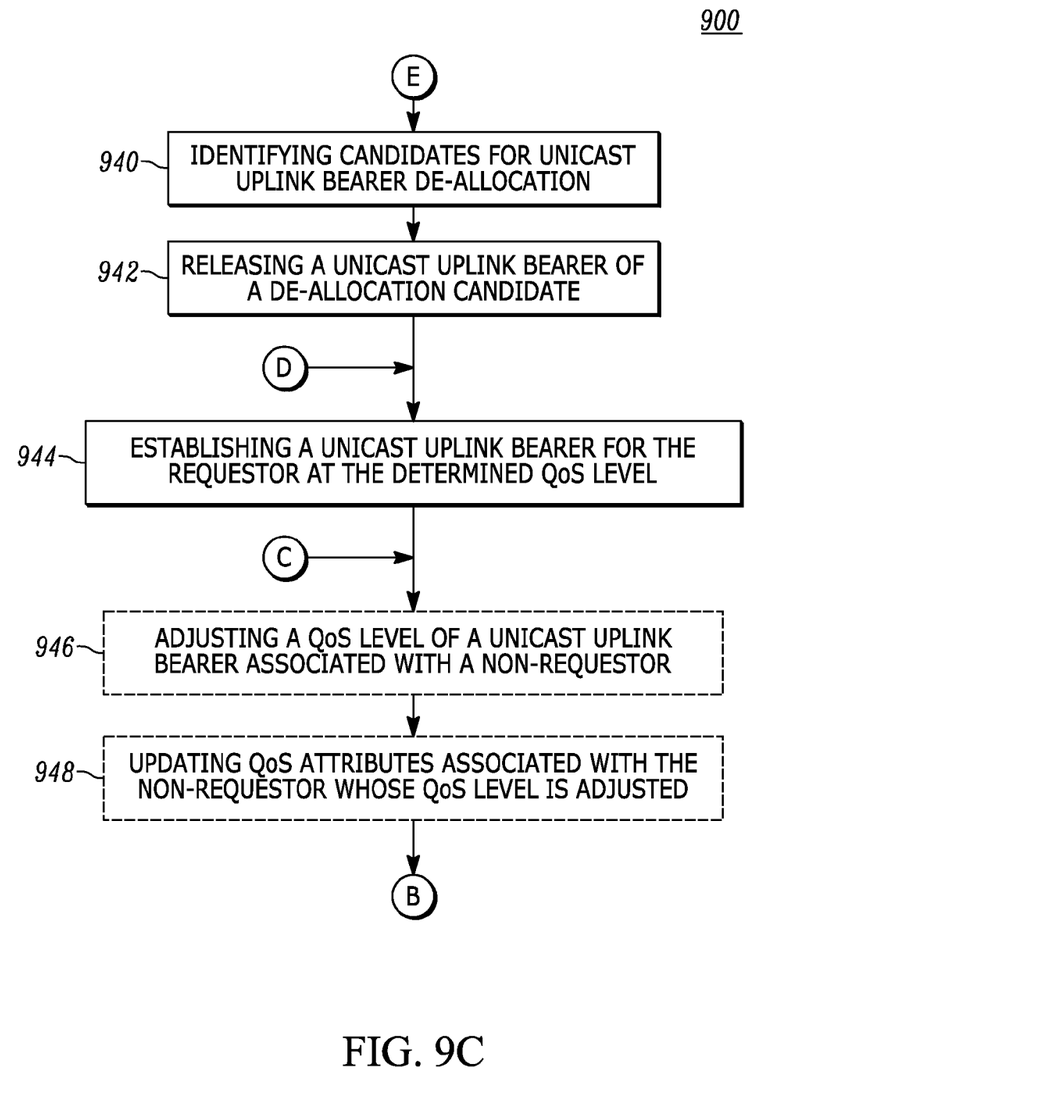
FIG. 9C is a continuation of the logic flow diagrams of FIGS. 9A and 9B illustrating a method of bearer control performed by a service network element of the communication system of FIG. 1 in accordance with various embodiments of the present invention.

Referring now to FIGS. 9A, 9B, and 9C, a logic flow diagram 900 is provided that illustrates a method of bearer control performed by communication system 100 in accordance with various embodiments of the present invention. Logic flow diagram 900 begins (902) when a service network element, such as PM 152 or Group Application Server 154, in conjunction with a first user device that is a member of communication group 101, for example, user device 102, initiates (904) a group call for communication group 101. For example, the service network element may receive a floor request or a session initiation message, such as a Session Initiation Protocol (SIP) Invite, from user device 102, requesting to initiate a group call involving communication group 101.

In response to receiving the request, the service network element invites the other members of communication group 101, that is, user devices 103-107, to participate in the group call. In one embodiment, the service network element then receives a response from each user device agreeing to participate in the call, such as a 200 OK message. In other embodiments, no such response may be required. Regardless, it is assumed herein, for purposes of illustrating the principles of the present invention, that each of user devices 102-107 initially participate in the call. Further, in response to receiving the request, the service network element retrieves (906), from policy database 158, a policy associated with the group call, such as an initial quality of service (QoS) level or a range of QoS levels, required or desired for the group call. The service network element also retrieves, from one or more of user profile database 406/506 and policy database 158, a user profile associated with each user device that is a member of communication group 101 and that is participating in the group call.

In addition, the service network element determines (908), for example, by reference to system utilization database 156, a level of system utilization, such as an availability of wireless resources for the group call and at each access node serving a participating user device, a number of participating user devices at a location, such as in a given cell and/or serviced by a given access node, and an availability of backhaul resources from such access node to the service network element.

The service network element allocates a downlink unicast bearer to each user device participating in the group call. In other embodiments, the service network element may allocate a downlink evolved Multimedia Broadcast Multicast Service (eMBMS) bearer for the group call. Further, based on the determined level of system utilization and a number of user devices participating in the group call, the service network element establishes multiple unicast uplink bearers for the group call.

Based on the user profile associated with each user device 102-107 participating in the group call, the service network element determines (910) pre-emption vulnerability and a priority level for each user device. Further, for each user device 102-107, the service network element determines an initial QoS level based on the QoS attributes of a pre-emption vulnerability and a priority level associated with that user device. Other QoS attributes, such as user profile parameters and also factors not included in the user profile, such as system utilization, also may be considered in determining the initial QoS level. That is, the service network element may determine, based on the parameters associated with a user of the user device and maintained in user profile database 406/506 and/or policy database 158, an initial QoS level for a unicast uplink bearer associated with each user device that is a member of communication group 101 and that is participating in the group call.

For example, in one embodiment of the present invention, the service network element may execute an algorithm that generates a QoS level for each user/user device based on parameters maintained in the user profile associated with that user/user device, such as pre-emption vulnerability and priority level. Again, other non-user profile parameters, such as system utilization, also may be considered. In various embodiments of the invention, the algorithm may employ weighting factors for each parameter, wherein some parameters may weigh more heavily than others, such as a role of the user or a recent talk time being more heavily weighted factors. In other embodiments of the invention, these weighting factors may be dynamically adjusted or may vary from user-to-user. Based on the initial QoS levels, the service network element then establishes (912) a unicast uplink bearer between each of user devices 102-107 and the service network element at the corresponding QoS level (for the purpose of illustrating the principles of the present invention.

That is, in response to determining system utilization, the service network element establishes multiple unicast uplink bearers for communication group 101 to produce multiple established unicast uplink bearers. In order to optimize a current and future distribution of bearers among the participants in a group call, communication system 100 provides for the established unicast uplink bearers to have different associated QoS levels. In turn, in determining QoS levels, pre-emption vulnerabilities and/or priority levels of the user associated with the bearer are considered. Thus, when a new unicast uplink bearer needs to be established for a user/user device or for a service or application running on that user device, QoS levels associated with established unicast uplink bearers at the same cell/access node as the user device needing a unicast uplink bearer, are considered in determining which unicast uplink bearer(s), if any, will be released.

The service network element then establishes a unicast uplink bearer for each of the user devices 102-107 at a QoS level appropriate for that user device, including requesting that access node 132 establish a unicast wireless uplink channel, at a requested QoS level, with each user device 102-107. For example and merely for the purpose of illustrating the principles of the present invention, suppose that a user device granted the floor, such as user device 102, as well as a second user device, such as user device 103, are associated with high priority levels and have unicast uplink bearers established at a highest QoS level. Further, suppose that a third and a fourth user device, such as user devices 104 and 105, are associated with lower priority levels and have unicast uplink bearers established at an associated QoS level lower than user devices 102 and 103 but higher than user devices 106 and 107. Additionally, suppose that a fifth and a sixth user device, such as user devices 106 and 107, are associated with a lowest priority levels (among user devices 102-107) and have uplink unicast bearers established at a lowest QoS level (relative to user devices 102-105). While three different priority levels and QoS levels are referenced here, that is merely for the purpose of illustrating the principles of the present invention and one of ordinary skill in the art realizes that any number of priority levels and QoS levels may be used in establishing unicast uplink bearers and the number of priority levels and QoS levels is up to a designer of communication system 100.

When the service network element receives a transmission, such as a talkspurt, from the user device granted the floor, that is, user device 102, the service network element updates (914) one or more QoS attributes associated with that user device, for example, parameters of the user profile associated with that user device and maintained in one or more of user profile database 406/506 and policy database 158, to indicate a time that the user device has just transmitted on an uplink bearer. Further, the service network element processes (916) the transmission. That is, the service network element receives the talkspurt from the first user device 102 via a unicast uplink bearer established with the user device and routes the talkspurt to the other participants in the group call, for example, via the allocated downlink unicast bearers and/or allocated downlink eMBMS bearer.

When the service network element detects (918) an end to the transmission by user device 102, the service network element again updates (920) one or more QoS attributes associated with that user device, such as parameters of the user profile associated with that user device and maintained in one or more of user profile database 406/506 and policy database 158, to indicate a time that the user device has stopped transmitting on the uplink bearer. The service network element then determines (922) whether another request to transmit has been received. For example, the service network element may receive a request to transmit, for example, a floor request, from a participating user device 102-107, or the service network element may receive a request to transmit with respect to a service or application running on one of participating user devices 102-107. When multiple requests to transmit are received, the service network element may grant, based on the user profile associated with the requesting user devices, a request to transmit to a user device/service/application associated with a highest QoS level.

If no further request to transmit is received, for example, if the group call is ended, then logic flow diagram 900 ends (950). In various other embodiments, the group call may end through an explicit 'end' message or through the expiration of a timer, or through any other means known in the art. However, if another request to transmit is received, then the service network element evaluates (924) the unicast uplink bearer established for the requesting user device, service, or application (the 'requestor') by reference to the QoS attributes maintained in the user profile associated with the requesting user device and further maintained in one or more of user profile database 406/506 and policy database 158. Based on the evaluation of the unicast uplink bearer established for the requestor, the service network element determines (926) whether the received request triggers an adjustment of priority levels of, and/or QoS levels of, the unicast uplink bearers established for, the user devices participating in the group call.

If a priority level and/or QoS level adjustment is not triggered, that is, when the requesting participating user device, such as user devices 102 and 103, and/or a requesting service or application at the requesting participating user device (and granted the right to transmit) already has an established unicast uplink bearer and a QoS or priority level adjustment is not desired, then logic flow diagram 900 returns to step 914. That is, the service network element receives a transmission, such as a talkspurt, from the requesting user device via its established unicast uplink bearer, updates QoS attributes associated with that user device, for example, parameters of a user profile associated with that user device and maintained in one or more of user profile database 406/506 and policy database 158, to reflect a time that the user device has just transmitted on its unicast uplink bearer, processes the transmission, detects an end to the transmission, and again updates the QoS attributes associated with that user device to reflect a time that the user device has stopped transmitting on the uplink bearer. However, one may note that even if the request to transmit is received from a user device that currently has an established non-pre-emptable unicast uplink bearer, unicast uplink bearers for all other group members can be re-evaluated and reconfigured in the background (such as the upgrade or downgrade of the QoS levels of unicast uplink bearers established for such other group members).

If a priority level and/or QoS level adjustment is triggered, that is, if the requestor, that is, the requesting participating user device and/or the requesting service or application at the requesting user device, does not currently have an established unicast uplink bearer, or if a priority level and/or QoS level adjustment of an established unicast uplink bearer of the requestor or of a non-requestor user device participating in the group call, is desired, then the service network element evaluates (928), by reference to one or more of user profile database 406/506 and policy database 158, QoS attributes, such as priority levels, and/or QoS levels associated with non-requestor participating user devices currently allocated unicast uplink bearers, that is, user devices 102-107, and/or services or applications running on those user devices and currently allocated unicast uplink bearers. For example, a low QoS level may be indicated by one or more of a pre-emption vulnerability flag and a priority level in the corresponding user's profile. Based on QoS attribute/QoS level evaluations of the requestor and the non-requestor user devices/services/applications, the service network element identifies (930) one or more participating user devices/services/applications that are candidates for a QoS level adjustment. For example, user devices 102 and 103, or services or applications running on those user devices, may be a candidate for a QoS level adjustment even though its unicast uplink bearer is a non-pre-emptable bearer.

If a QoS level adjustment has been triggered (for example, if the unicast uplink bearer established for the requesting user device, service, or application has a low QoS level) and the requesting user device, service, or application (the 'requestor'), for example, user device 104, currently has an established unicast uplink bearer (932), then the service network element may adjust (934) one or more of a QoS attribute, such as a priority level, associated with the requestor and a QoS level of the requestor's established unicast uplink bearer. That is, the service network element may raise a QoS level associated with the unicast uplink bearer associated with the requesting user device/service/application to a level required or desired for a transmission of voice or data by the requesting user device/service/application. Correspondingly, the service network element may raise a priority level associated with the requestor. Logic flow diagram 900 then proceeds to step 946.

If a QoS level adjustment has been triggered and the requesting user device, service, or application (the 'requestor') does not currently have an established unicast uplink bearer (932), then the service network element determines (936) a QoS level for a unicast uplink bearer for the requestor, that is, for the requesting user device, service, or application, based on the QoS attributes associated with the requestor, such as the parameters of the user profile associated with the user device and maintained in user profile database 406/506 and/or policy database 158, as described in greater detail above. Further, the service network element determines (938) whether the bandwidth available for allocation to the requestor, that is, the requesting user device, service, or application, is sufficient to establish a unicast uplink bearer for the requesting user device, service, or application.

If, at step 938, the service network element determines that sufficient bandwidth available for allocation to the requestor, then logic flow diagram 900 proceeds to step 944.

If, at step 938, the service network element determines that the bandwidth available for allocation to the requestor is insufficient, then the service network element identifies (940), by reference to the QoS levels associated with unicast uplink bearers established at the same cell/access node as the requestor, a user devices/services/applications that is a candidate for de-allocation, that is, release, of its unicast uplink bearer; however, the identified one or more user devices/services/applications need not be a user device/service/application participating in the same group call as the requestor. The identified one or more user devices/services/applications preferably are user devices/services/applications, from among the user devices/services/applications having an established a unicast uplink bearer (user devices 102-106), whose unicast uplink bearer is pre-emptable, and who have a lowest QoS level. The service network element then de-allocates, that is, releases or tears down, (942) a unicast uplink bearer associated with the identified user device/service/application. Logic flow diagram 900 then proceeds to step 944.

At step 944, the service network element establishes a new unicast uplink bearer at the requestor, that is, the requesting participating user device or the service or application requesting to transmit at the requesting user device. In one embodiment of the present invention, logic flow diagram then may return to step 914. In another embodiment of the present invention, logic flow diagram then may proceed to step 946.

At step 946, the service network element may adjust a QoS level of the unicast uplink bearer associated with the non-requestor user devices/services/applications. For example, the service network element may decrease a QoS level of a unicast uplink bearer of one or more non-requestor user devices/services/applications. Preferably, the one or more user devices/services/applications whose QoS level is decreased are user devices/services/applications whose unicast uplink bearers have a lowest QoS level, and/or a lowest priority level based on the user profiles maintained in user profile database 406/506 and/or policy database 158, among user devices/services/applications who have established unicast uplink bearers as the same cell/access node as the requestor. The service network element then may update (948) QoS attributes associated with the non-requestor whose unicast uplink bearers have been adjusted, such as parameters, for example, a priority level, of the user profile associated with the non-requestor and maintained in one or more of user profile database 406/506 and policy database 158, associated with the user devices to reflect the adjustments. Logic flow diagram 900 then returns to step 914.

In another embodiment of the present invention, the service network element further may delay permission for a user of a user device to speak while the bearer allocated to user device 104 is being established of is being adjusted, for example, by delaying a conveyance of a talk permit tone to the user device or by conveying an extended talk permit tone to the user device.

By establishing unicast uplink bearers for user devices participating in a group call, transmission delays that may result when such bearers are allocated and set up merely in response to a request to transmit is reduced. Further, by adjusting QoS levels of unicast uplink bearers during the group call, an appropriate QoS level may be provided to transmitting user devices. Also, by implementing a per-user preemption function that, in response to receiving a new bearer request associated with a user device, communication system 100 can free up RF bandwidth from pre-emptable bearers currently allocated to other user devices (while not pre-empting non-pre-emptable bearers), better assuring that provision of higher priority users, services, or applications, such as emergency responder services, will not be blocked by lower priority users, services, or applications.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Moreover, an embodiment can be implemented as a non-transitory computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for bearer control in a group call, the method comprising:

receiving a trigger to adjust a quality of service (QoS) level of an uplink bearer of a plurality of uplink bearers established for the group call;

identifying, based on a profile associated with each user device, two or more user devices as candidates for a QoS adjustment of an uplink bearer, wherein at least one user device of the two or more user devices is a participant in the group call;

increasing a QoS level of an uplink bearer, of the plurality of uplink bearers, of a user device of the two or more user devices identified as candidates for a QoS adjustment, wherein the user device whose QoS level is increased is a participant in the group call; and decreasing a QoS level of an uplink bearer of another user device of the two or more user devices identified as candidates for a QoS adjustment, wherein the another user device is selected for a QoS adjustment based on a pre-emption vulnerability and a priority level associated with the another user device.

2. The method of claim 1, wherein receiving a trigger to adjust a quality of service (QoS) level of an uplink bearer comprises receiving a request to start a new call.

3. The method of claim 1, wherein receiving a trigger to adjust a quality of service (QoS) level of an uplink bearer comprises receiving a floor request for the group call.

4. The method of claim 3, further comprising:

delaying permission for the user of the participating user device requesting the floor to speak while an uplink bearer associated with the participating user device requesting the floor to speak is being adjusted.

5. The method of claim 3, wherein the floor request is received from a participating user device of the plurality of participating user devices and wherein receiving a trigger to a quality of service (QoS) level of an uplink bearer further comprises:

determining that the participating user device requesting the floor requires an adjustment of a quality of service level of an established uplink bearer.

6. The method of claim 5, wherein one or more participating user devices have high quality of service (QoS) level uplink bearers and one or more other participating user devices have low QoS level uplink bearers and wherein determining that the participating user device requesting the floor requires an adjustment of a quality of service level comprises determining that the uplink bearer established for the participating user device requesting the floor is a low QoS level uplink bearer.

7. The method of claim 6, wherein the low QoS level is indicated by one or more of a preemption vulnerable flag and a priority level.

8. The method of claim 1, wherein the another user device, of the two or more user devices, whose QoS level is decreased is a participant in a different group call than the user device, of the two or more user devices, whose QoS level is increased.

9. The method of claim 1, wherein decreasing a QoS level of an uplink bearer for a participating user device comprises determining that the uplink bearer whose QoS level is decreased is a pre-emptable bearer.

10. The method of claim 1, further comprising:
updating a profile associated with each participating user device whose uplink bearer was adjusted.

11. The method of claim 1, wherein the another user device, of the two or more user devices, whose QoS level is decreased is identified based on two or more of:
a time period that has expired since the user device has most recently transmitted on an uplink bearer;
a role of a user associated with the user device;
a priority of a user associated with the user device;
a location of the user device; and
a relationship between the user and one or more other participants in the group call.

12. The method of claim 1, further comprising:
in response to adjusting a QoS level of an uplink bearer of the participating user device, updating a profile associated with the participating user device.

13. A service network element capable of bearer control in a group call, the service network element comprising:
a processor that is configured to:
receive a trigger to adjust a quality of service (QoS) level of an uplink bearer established for a group call of a plurality of uplink bearers established for the group call;
identify, based on a profile associated with each user device, two or more user devices as candidates for a QoS adjustment of an uplink bearer, wherein at least one user device of the two or more user devices is a participant in the group call; and
increase a QoS level of an uplink bearer, of the plurality of uplink bearers, of a user device of the two or more user devices identified as candidates for a QoS adjustment, wherein the user device whose QoS level is increased is a participant in the group call; and
decrease a QoS level of an uplink bearer of another user device of the two or more user devices identified as candidates for a QoS adjustment, wherein the another user device is selected for a QoS adjustment based on a pre-emption vulnerability and a priority level associated with the another user device.

14. The service network element of claim 13, wherein the processor is configured to receive a trigger to adjust a quality of service (QoS) level of an uplink bearer by receiving a request to start a new call.

15. The service network element of claim 13, wherein the processor is configured to receive a trigger to adjust a quality of service (QoS) level of an uplink bearer by receiving a floor request for the group call.

16. The service network element of claim 15, wherein the processor is configured to:
delay permission for the user of the participating user device requesting the floor to speak while an uplink bearer associated with the participating user device requesting the floor to speak is being adjusted.

17. The service network element of claim 15, wherein the floor request is received from a participating user device of the plurality of participating user devices and wherein the processor further is configured to determine that the participating user device requesting the floor requires an adjustment of a quality of service level of an established uplink bearer.

18. The method of claim 17, wherein one or more participating user devices have high quality of service (QoS) level uplink bearers and one or more other participating user devices have low QoS uplink bearers and wherein the processor is configured to determine that the participating user device requesting the floor requires an adjustment of a quality of service level by determining that the uplink bearer established for the participating user device requesting the floor is a low QoS level uplink bearer.

19. The method of claim 18, wherein the low QoS level comprises one or more of a pre-emption vulnerability flag and a priority level.

20. The service network element of claim 13, wherein the another user device, of the two or more user devices, whose QoS level is decreased is a participant in a different group call than the user device, of the two or more user devices whose QoS level is increased.

21. The service network element of claim 13, wherein the processor is configured to decrease a QoS level of an uplink bearer by determining that the uplink bearer whose QoS level is decreased is a pre-emptable bearer.

22. The service network element of claim 13, wherein the processor further is configured to:
update a profile associated with each participating user device whose uplink bearer was adjusted.

23. The service network element of claim 13, wherein the another user device, of the two or more user devices, whose QoS level is decreased is identified based on two or more of:
a time period that has expired since the user device has most recently transmitted on an uplink bearer;
a role of a user associated with the user device;
a priority of a user associated with the user device;
a location of the user device; and
a relationship between the user and one or more other participants in the group call.

24. The service network element of claim 13, wherein the processor further is configured to:
in response to adjusting a QoS level of an uplink bearer of the participating user device, updating a profile associated with the participating user device.

25. The service network element of claim 13, wherein the service network element is a Group Application Server.

26. The service network element of claim 13, wherein the service network element is a Priority Manager.

* * * * *